(12) United States Patent
Izawa et al.

(10) Patent No.: US 6,371,839 B2
(45) Date of Patent: Apr. 16, 2002

(54) CONSTANT ABRASIVE FEEDER OF ABRASIVE GRAINS

(75) Inventors: Moriyasu Izawa, Aichi-ken; Hiromichi Horikawa, Ichinomiya; Hiroyasu Yashiro, Gifu-ken; Mikitoshi Hiraga, Iwakura; Yasuhiro Nagae, Aichi-ken, all of (JP)

(73) Assignee: Sintobrator, LTD, Nagoya (JP)

(*) Notice: Subject to any disclaimer, the term of this patent is extended or adjusted under 35 U.S.C. 154(b) by 0 days.

(21) Appl. No.: 09/783,615

(22) Filed: Feb. 15, 2001

(30) Foreign Application Priority Data

Mar. 8, 2000 (JP) .......................................... 2000-063051

(51) Int. Cl.⁷ .................................................. B24C 9/00
(52) U.S. Cl. ............................... 451/88; 451/75; 451/87; 451/89; 451/90; 451/91; 451/99
(58) Field of Search ............................... 451/75, 87, 88, 451/89, 90, 91, 99

(56) References Cited

U.S. PATENT DOCUMENTS 4,993,200 A * 2/1991 Morioka et al. .............. 451/88

FOREIGN PATENT DOCUMENTS

JP 47-26491 11/1972
JP 10217125 8/1998

* cited by examiner

*Primary Examiner*—Joseph J. Hail, III
*Assistant Examiner*—Shantese McDonald
(74) *Attorney, Agent, or Firm*—Rader, Fishman & Grauer, PLLC

(57) ABSTRACT

An constant abrasive feeder of abrasive grains M is formed of a reservoir supply section 20 having a reservoir tank 21 and a buffer tank 31, a stirring hopper 40 for stirring abrasive grains S, and a vibration feeder 60 for supplying the abrasive grains S to an abrasive jet nozzle 5. The abrasive grains S recovered in a cyclone 1 is reserved in the reservoir tank 21 and the buffer tank 31 by a constant quantity, the abrasive grains S is sent from the buffer tank 31 and reserved in a reservoir 43, which is stirred by stirring bars 50, 51 and sent to a supply guide 45. Then, the abrasive grains S is sequentially supplied to a feeder body 61 of the vibration feeder 60 from an opening formed in the supply guide 45.

4 Claims, 3 Drawing Sheets

CONSTANT ABRASIVE FEEDER OF ABRASIVE GRAINS

BACKGROUND OF THE INVENTION

1. Field of the Invention

The present invention relates to an constant abrasive feeder of abrasive grains, which is used for a high precision micro machine device for shot blasting or shot peening and capable of stably supplying a constant quantity of abrasive grains to an abrasive jet nozzle. More particularly, the invention relates to the constant abrasive feeder of abrasive grains suitable for shot blasting, i.e., fine shot blasting which is conducted while stably supplying a constant quantity of fine materials.

2. Description of Related Art

A conventional shot blasting has been utilized as relatively rough finishing means, for example, for deburring or descaling from castings using the abrasive grains having size of several hundreds $\mu$m or greater with high fluidity. Therefore, the shot blasting could be carried out without providing the constant abrasive feeder of abrasive grains separately (see Utility Model Application Laid-Open sho 47-26491).

The working processes such as blasting finishings (machinings) have been wanted to apply to fine finishings, because the blasting finishings are carried out without chemicals which pollute the water. The applications are exemplified: formations of barrier ribs on a plasma display panel (PDP) and of electrodes on a dielectric filter, the formations have been conventionally carried out with chemical etchings or screen printings.

However, such fine work utilizes the abrasive grains having a size of several tens $\mu$m or smaller. If the size of the abrasive grains becomes several tens $\mu$m or smaller, a constant quantity of abrasive grains can not be stably supplied to the abrasive jet nozzle due to pressure of the fluid such as air utilized for blasting the abrasive grains from the abrasive jet nozzle.

According to the conventional apparatus disclosed in Japanese Patent No. 2876400, a reservoir tank and a buffer tank are arranged to constitute a reservoir supply section, which supplies a constant quantity of the reserved abrasive grains so as to be intermittently supplied to a vibration feeder air-tightly. As a result, a constant quantity of the abrasive grains can be supplied to the abrasive jet nozzle in a stable manner.

However, in the conventional apparatus disclosed in Japanese Patent No. 2876400, when supplying a constant quantity of abrasive grains from the reservoir supply section to the vibration feeder, it is intensively supplied from the buffer tank disposed in the reservoir supply section while pouring the abrasive grains into a funnel in the vibration feeder. As a result, the abrasive grains coagulates in the buffer, thus causing bridging state. Therefore, it has been difficult to stably supply the constant quantity of the abrasive grains to the abrasive jet nozzle.

SUMMARY OF THE INVENTION

In view of the foregoing problems, it is an object of the present invention to provide an constant abrasive feeder of abrasive grains, which uses fine abrasive grains circularly and allows stable supply of the recovered abrasive grains to the abrasive jet nozzle by preventing the material from being bridged.

In the constant abrasive feeder of the abrasive grains, the abrasive grains blasted from an abrasive jet nozzle is recovered in a cyclone which separates the abrasive grains from the dust mixed in the abrasive grains, and the abrasive grains is supplied to be reserved in a reservoir supply section to supply a constant quantity of the reserved abrasive grains sequentially to the abrasive jet nozzle by a vibration feeder;

the reservoir supply section disconnects a communication state to the vibration feeder at the inflow of the recovered abrasive grains, and disconnects a communication state to the cyclone at the supply of the abrasive grains to the vibration feeder;

the vibration feeder includes a feeder body and a vibrator such that the constant quality of the abrasive grains supplied from the reservoir supply section is transferred on a feeder and supplied to the abrasive jet nozzle; and a stirring hopper is disposed between the reservoir supply section and the vibration feeder for stirring the constant quantity of the abrasive grains sent from the reservoir supply section so as to be supplied to the vibration feeder.

Therefore, the abrasive grains blasted from the abrasive jet nozzle is recovered in a cyclone where it is separated from the dust attached thereto. Then the dust is collected by the dust collector such that only the abrasive grains can be fed to the reservoir supply section. At this time, the reservoir supply section reserves a constant quantity of the abrasive grains fed from the cyclone so as to be sent to a stirring hopper.

At this time, the reservoir supply section reserves a constant quantity of the abrasive grains fed from the cyclone and disconnect the communication state with the cyclone so as to prevent pressure fluctuation by bringing the reservoir supply section, stirring hopper portion and the vibration feeder into an air-tight state.

The stirring hopper stirs the constant quantity of the abrasive grains supplied from the reservoir supply section to fractionate the abrasive grains which is likely to clump together such that it can be fed to the vibration feeder. This makes it possible to prevent the flow of the reserved abrasive grains from being suspended in the stirring hopper.

Thereafter, the constant quantity of abrasive grains is supplied to the abrasive jet nozzle from the vibration feeder so as to be blasted to the work through the abrasive jet nozzle. Therefore, this apparatus can stably supply the constant quantity of abrasive grains to the vibration feeder with no pressure fluctuation through stirring in the stirring hopper to prevent suspension of the material flow.

As described above, the apparatus of the present invention can stably supply the constant quantity of abrasive grains to the abrasive jet nozzle using the fractionated abrasive grains in a circulating manner.

A constant quantity of fractionated low fluidity abrasive grains with a size of several tens $\mu$m or smaller can stably be supplied. Accordingly the present invention may be applied to high precise micro machine device so as to enhance the precision of machining as well as the yield resulting from reduced number of defect parts.

Further, the reservoir supply section includes a reservoir tank and a buffer tank vertically aligned in a two-stage manner. At the inflow of the recovered abrasive grains, an opening/closing shutter disposed in the buffer tank is closed to disconnect the communication state to the vibration feeder. At the supply of the abrasive grains to the vibration feeder, an opening/closing shutter disposed in the reservoir tank is closed to disconnect the communication state to the cyclone.

Therefore, at the supply of the abrasive grains from the reservoir supply section to the stirring hopper, if the communication to the cyclone is disconnected, i.e., if the opening/closing shutter of the reservoir located in the upper stage is closed at the supply of the abrasive grains to the stirring hopper, the material reserved in the buffer tank located in the lower stage can be supplied with no pressure fluctuation in the state where the reservoir supply section, stirring hopper and vibration feeder are kept air-tight.

Further, the stirring hopper is formed of a hopper including a cylindrical stirring hopper and a reservoir tank with its shape tapered downward, a supply guide disposed downward of the hopper, and a hopper connected to a power source and capable of stirring the abrasive grains.

Therefore, in the stirring hopper, the stirring section connected to the power source stirs the constant quantity of abrasive grains supplied from the reservoir supply section and reserved in the reservoir shaped tapered downward for the supply to the supply guide. Therefore, the reserved abrasive grains which is likely to clump together can reliably be fractionated so as to prevent the flow of the reserved abrasive grains from being suspended.

Further, the vibrator vibrates the abrasive grains supplied from above such that the vibration feeder supplies the abrasive grains to an outlet port formed in the lower portion.

Therefore, the vibration feeder receives the abrasive grains stirred and fractionated in the stirring hopper and supplies it from the upper stirring hopper to the lower outlet port through vibration of the vibrator. This makes it possible to prevent clump of the abrasive grains during transfer such that a constant quantity of the material can be reliably supplied to the abrasive jet nozzle in a stable manner.

DESCRIPTION OF THE PREFERRED EMBODIMENT

Figure 1:
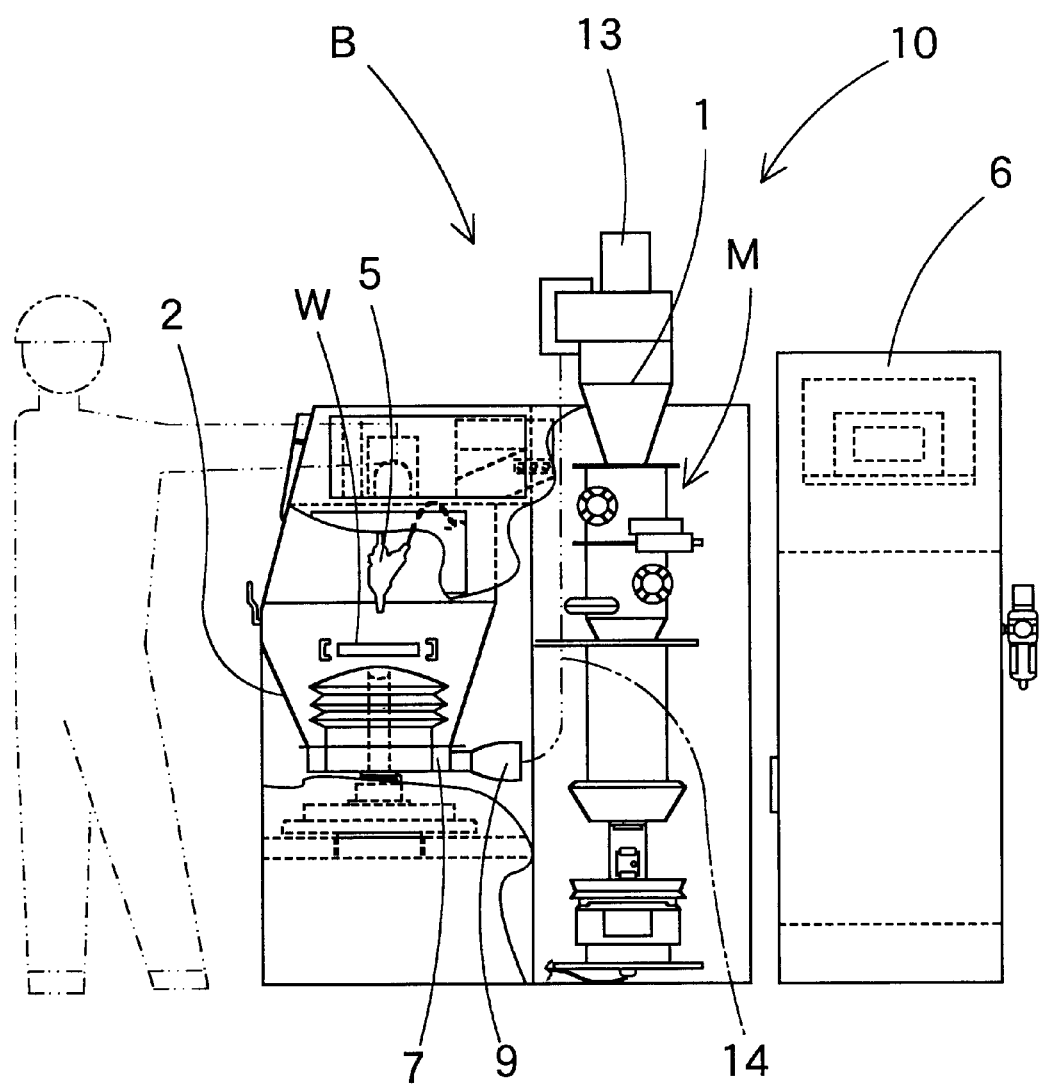
FIG. 1 is a schematic view showing a high precision micro machine device employing an constant abrasive feeder of abrasive grains according to one form of the present invention.

An embodiment of the present invention will be explained referring to the drawings. As shown in FIG. 1, an constant abrasive feeder of an abrasive grains (hereinafter referred to as a constant quantity supply unit) M is disposed in a high precision micro machine device B, and disposed downward of a cyclone 1 that accommodates recovered abrasive grains S. An cabinet 2 is disposed forward of the constant quantity supply unit M (on the side of an operator). An abrasive jet nozzle 5 connected to the constant quantity supply unit M is disposed in the cabinet 2 such that the abrasive grains S is blasted to a work W to be processed. A dust collector 6 is disposed behind the constant quantity supply unit M for collecting the dust attached to the recovered abrasive grains S.

The cabinet 2 is formed into a hollow shape for accommodating the work W, and its lower portion is tapered downward, and a recovery section 7 for recovering the abrasive grains S is mounted to the bottom of the cabinet 2. The recovery section 7 has an outlet port 9 at its rear end, and a circulation pipe 14 for recovering the abrasive grains S is connected to the cyclone 1.

Figure 2:
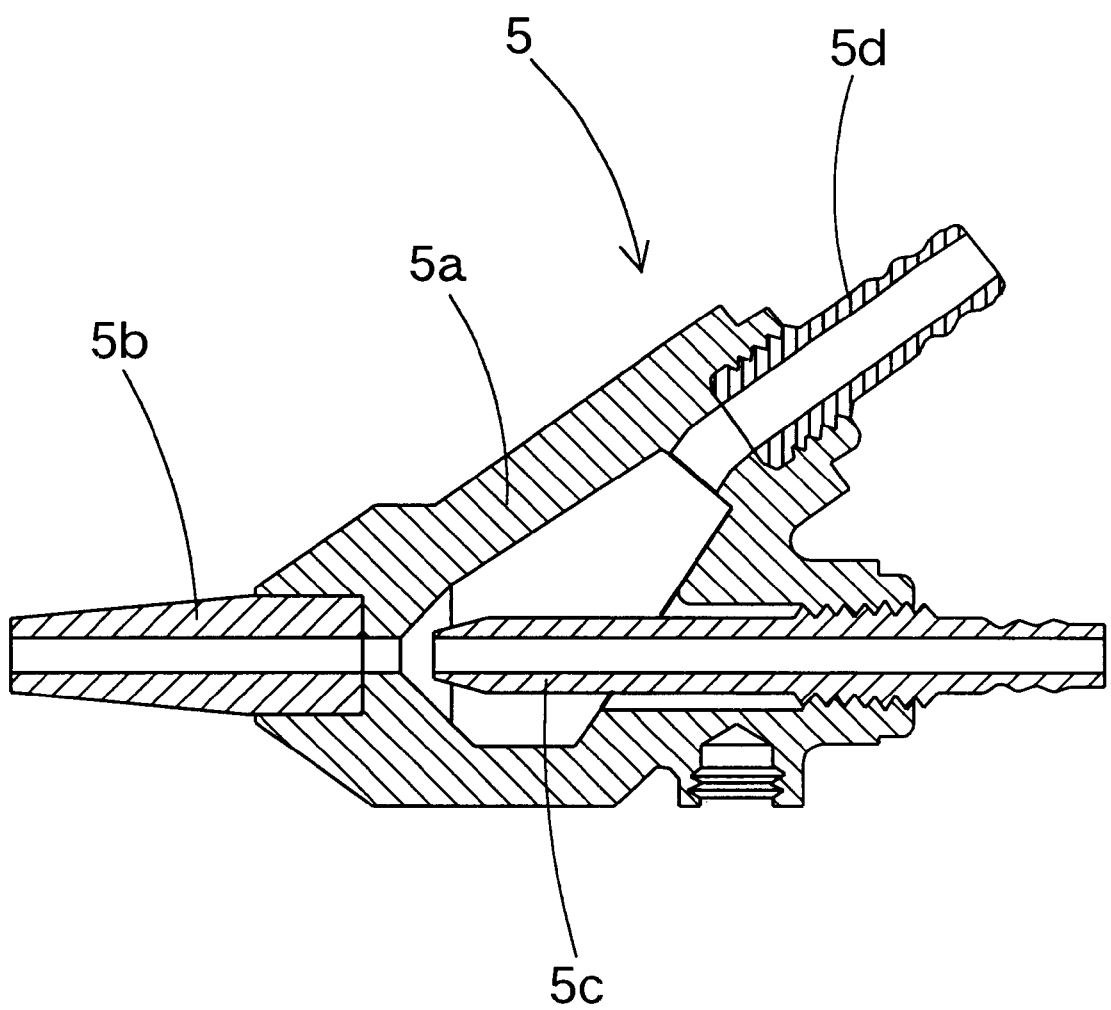
FIG. 2 is a sectional view of abrasive jet nozzle shown in FIG. 1.

As shown in FIG. 2, the abrasive jet nozzle 5 is formed of a body 5a, a olifis 5b for blasting the abrasive grains S, an air jet nozzle 5c for introducing compressed air as blast fluid, and a nipple 5d for introducing the abrasive grains S, which are fixedly disposed. Compressed air as blast fluid is introduced, which has been supplied through a pipe connected to a compressed air source, and air adjusting means including a dryer, a pressure adjuster, a pressure gauge, on-off valve and the like. In this abrasive jet nozzle 5, if the compressed air is introduced into the body 5a from the air jet nozzle 5c and discharged from the olifis 5b, pressure in the vicinity of the nipple 5d in the body 5a is reduced into negative pressure, and air in the vicinity of the nipple 5d is pulled by the compressed air, and by such an ejector effect, the abrasive grains S supplied from the constant quantity supply unit M is drawn and blasted from the olifis 5b together with the compressed air through the nipple 5d.

In the illustrated abrasive jet nozzle 5, the air jet nozzle 5c for introducing the compressed air as the blast fluid, and the nipple 5d for introducing the abrasive grains S are disposed so that the ejector effect can be obtained in the abrasive jet nozzle 5. Alternatively, if a regulator or the like capable of exerting the ejector effect while the abrasive grains S is transferred, the abrasive jet nozzle 5 may be structured such that the air jet nozzle 5c is eliminated and that portion is closed.

After processing the work W using the abrasive grains S blasted through the abrasive jet nozzle 5, the abrasive grains S flows on the airflow from the outlet port 9 in the bottom of the cabinet 2 so as to be recovered into the cyclone 1 by means of a abrasive reclaimer 10. The abrasive reclaimer 10 can also be used for an apparatus for separating the dust from the abrasive grains, which utilizes the dust collector 6. The dust collector 6 is connected to a flexible hose (not shown), the other end of which is connected to an exhaust pipe 13 disposed on the center of the upper portion of the cyclone 1. A circulating pipe 14 is connected to a peripheral surface of the upper portion of the cyclone 1 in a substantially tangential direction of the peripheral surface, and the circulating pipe 14 connects the cyclone 1 and the discharge port 9. In this abrasive reclaimer 10, the upper portion of the cyclone 1 is evacuated into negative pressure when the dust collector 6 is operated. The abrasive grains S from the outlet port 9 is recovered into the cyclone 1 through the circulating pipe 14, and the dust in the cyclone 1 is collected into the dust collector 6 through the exhaust pipe 13 and the hose.

Figure 3:
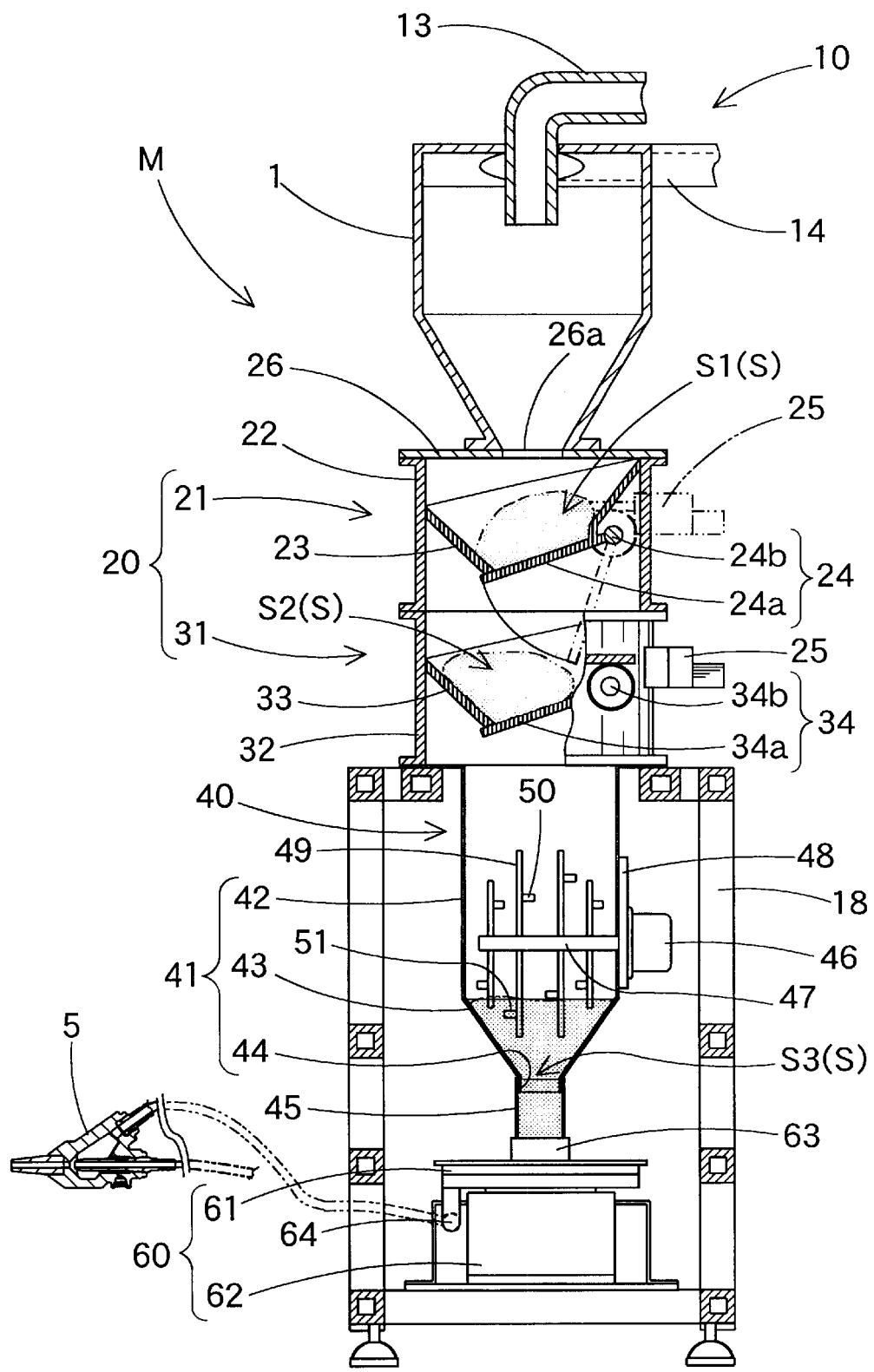
FIG. 3 is a schematic sectional view of the constant abrasive feeder of abrasive grains shown in FIG. 1.

Next, the constant quantity supply unit of the embodiment will be explained. As shown in FIG. 3, the constant quantity supply unit M of the embodiment is mounted below the cyclone 1 provided in its upper portion with the outlet pipe 13 and the circulating pipe 14, and includes a reservoir supply section 20, a stirring hopper 40 and a vibration feeder 60.

The reservoir supply section 20 can reserve the abrasive grains S blasted through the abrasive jet nozzle 5 and recovered by the abrasive reclaimer 10 so as to supply the abrasive grains S to the stirring hopper 40. In this embodiment, the reservoir supply section 20 is formed of a reservoir tank 21 and a buffer tank 31.

The reservoir tank 21 is disposed on the inner periphery of a cylindrical peripheral wall 22, and includes a hopper 23 with the shape tapered downward, and a shutter 24 disposed in an opening 23a at the lower end of the hopper 23. The reservoir tank 21 is disposed above the buffer tank 31, and connected to the lower end of the cyclone 1 air-tightly.

The upper end of the peripheral wall 22 is closed with a ceiling wall 26 to define an opening 26a therein such that the abrasive grains S recovered in the cyclone 1 by the abrasive reclaimer 10 is reserved in the hopper 23 on the shutter 24 in the reservoir tank 21 through the opening 26a.

The shutter 24 is formed of a body 24a for closing the hopper opening 23a, and a supporting shaft 24b formed on the end of the body 24a. An opening/closing mechanism 25 is connected to the supporting shaft 24b such that the shutter body 24a can open and close the opening 23a. The opening/closing mechanism 25 constitutes a motor capable of performing bilateral turn based on a predetermined electric signal.

When the shutter 24 is opened, the abrasive grains S reserved on the shutter body 24a is supplied to the buffer tank 31.

The buffer tank 31 is disposed on the inner periphery of a cylindrical peripheral wall 32, and formed of a hopper 33 with the shape tapered downward, and a shutter 34 disposed on an opening 33a formed in a lower end of the hopper 33. The upper end of the peripheral wall 32 is air-tightly connected to the lower end of the peripheral wall 22 of the reservoir tank 21, and the lower end of the peripheral wall 32 is air-tightly connected to the stirring hopper 40.

The shutter 34 is formed of a body 34a for closing the hopper opening 33a, and a supporting shaft 34b formed on the end of the body 34a. An opening/closing mechanism 25 including a motor capable of performing bilateral turning is connected to the supporting shaft 34b so that the shutter body 34a can open and close the opening 33a at a predetermined time.

These opening/closing mechanisms 25 of the buffer tank 31 and the reservoir tank 21 are controlled such that when one of the shutters 24, 34 opens one of the openings 23a, 33a, the other shutter closes the other opening.

In this embodiment, the buffer tank 31 is identical to the reservoir tank 21 except the ceiling wall 26 thereof for reducing the number of parts.

The stirring hopper 40 is formed of a hopper 41, a supply guide 45 and a motor 46, which is mounted to the lower end of the buffer tank 31 and disposed in a frame 18. The hopper 41 is provided at its upper portion with a cylindrical stirring body 42, a reservoir 43 connected to the lower end of the stirring body 42 with the shape tapered downward, and a small-diameter cylinder 44 connected to the lower end of the reservoir 43. The supply guide 45 is formed into a cylindrical shape and mounted to surround the small-diameter cylinder 44. The motor 46 is allowed to have a driving shaft 47 inserted into the stirring body 42 from one end thereof and mounted to a bracket 48 supported by the stirring body 42.

Plate-like (or disc-like) vanes 49 are mounted to the driving shaft 47 disposed in the stirring body 42 so as to lengthen from the opposite side of the driving shaft 47 perpendicular thereto. To each of the vanes 49, stirring bars 50, 51 axially lengthening from the driving shaft 47 parallel to the opposite directions are mounted at positions separated from the driving shaft 47. It is preferable that the stirring bars 50, 51 are not formed concentrically with respect to the axis so as to disperse the abrasive grains S as fine as possible. The vanes are not limited to those illustrated in the drawing, and three or more stirring bars may be formed on each vane portion.

Therefore, as the vanes 49 are rotated by the motor 46, the abrasive grains S flowing from the buffer tank 31 and reserved in the reservoir 43 is stirred by the stirring bars 50, 51, the abrasive grains S can be fractionated to prevent clump thereof. The abrasive grains S can be supplied while preventing suspension of the material flow in the stirring hopper 40 and is fed to supply guide 45.

A temperature in the stirring hopper 40 is increased by a heating machine like a heater so as to be kept constant.

The lower surface of the supply guide 45 is closed, the lower outer peripheral surface is formed with an opening (not shown) in its circumferential direction or axial direction. The abrasive grains S stirred by the stirring bars 50, 51 and reserved in the reservoir 43 and the supply guide 45 are allowed to flow to the vibration feeder 60. The opening is formed such that a necessary quantity of abrasive grains S can be sequentially supplied to avoid insufficiency of the abrasive grains S flowing into the vibration feeder 60.

The vibration feeder 60 is formed of a feeder body 61 and a vibrator 65. A supply port 63 formed on the upper portion of the feeder body 61 is positioned to surround the supply guide 45 of the stirring hopper 40. A feeder (not shown) disposed in the feeder body 61 extends from the upper supply port 63 to the exhaust port 64 formed at the lower portion of the feeder body 61. The abrasive grains S passing through the supply port 63 is discharged through the feeder. The abrasive jet nozzle 5 is connected to the exhaust port 64 formed in the feeder body 61 through a hose, and a constant quantity of abrasive grains S is supplied from the feeder body 61 to the abrasive jet nozzle 5.

The vibrator 65 is supported by the frame 18 of the constant quantity supply unit M to hold the feeder body 61.

The description how the constant quantity supply unit M is used will be explained. When the constant quantity supply unit M is charged with no abrasive grains S, about ⅓ of necessary quantity of abrasive grains S is charged into the cabinet 2. Then the dust collector 6 of the abrasive reclaimer 10 is operated such that the abrasive grains S is reserved in the reservoir tank 21 of the reservoir supply section 20 through the cyclone 1 (abrasive grains reserved in the reservoir tank 21 is referred to as the abrasive grains S1).

Then, the shutter 24 is opened to transfer the abrasive grains S1 to the buffer tank 31 (the abrasive grains transferred to the buffer tank 31 is referred to as the abrasive grains S2). Then, the shutter 24 is closed, approximately ⅓ of necessary quantity of abrasive grains S is charged into the cabinet 2, and the dust collector 6 of the abrasive reclaimer 10 is operated again, reserving the abrasive grains S1 in the reservoir tank 21.

Next, the shutter 34 is opened to send the abrasive grains S2 to the stirring hopper 40 such that the abrasive grains S reserved in the reservoir 43 is stirred by the stirring bars 50, 51 rotated by the driving shaft 47 driven through the motor 46. In this state, the abrasive grains is transferred to the feeder body 61 through the supply guide 45 (the abrasive grains transferred to the supply guide 45 is referred to as the abrasive grains S3). Then the shutter 24 is opened to reserve the abrasive grains S2 in the buffer tank 31.

Thereafter, approximately ⅓ of necessary quantity of abrasive grains S is charged into the cabinet 2, and the dust collector 6 of the abrasive reclaimer 10 is operated again. The abrasive grainss S1, S2, S3 are reserved in the reservoir tank 21, buffer tank 31 and reservoir 43 (including the supply guide 45), respectively.

Next, the vibrator 65 and the dust collector 6 are operated, and a solenoid valve connected to the abrasive jet nozzle 5 is opened. These operations are simultaneously started and finished. At that time, when the abrasive grains S is blasted through the abrasive jet nozzle 5, the abrasive grains S is assumed to be supplied onto the feeder of the feeder body 61 of the vibration feeder 60, and a preparation operation is assumed to be completed. Then the constant quantity supply unit M is once stopped.

In order to process the work W, it is placed in the cabinet 2, the vibrator 65 and the dust collector 6 are operated, and the solenoid valve is opened. With this operation, the abrasive grains S is blasted through the abrasive jet nozzle 5 to the work W for blasting operation.

At that time, the abrasive grains S is blasted from the abrasive jet nozzle 5 through the vibration feeder 60. As the abrasive grains S filled from the supply guide 45 has been reserved on the feeder of the vibration feeder 60, the abrasive grains S is continuously supplied to the abrasive jet nozzle 5 without interruption. The abrasive grains S recovered by the cabinet 2 is supplied to the reservoir tank 21 by operating the abrasive reclaimer 10.

The blast quantity of abrasive grains S from the abrasive jet nozzle 5 corresponds to the cumulative time when the vibrator 65 and the solenoid valve are operated. Therefore, the shutter 34 serves to open the opening 33a in correspondence with the operation cumulative time of the vibrator 65 and the like, the abrasive grains S is supplied to the supply guide 45 from the buffer tank 31 through the stirring hopper 40. While the shutter 34 serves to close the opening 33a, the shutter 24 opens the opening 23a so as to supply the abrasive grains S from the reservoir tank 21 to the buffer tank 31. The aforementioned operations may be sequentially operated by an operator. However, it is preferable to utilize a constant control circuit to automatically control the operations.

According to the constant quantity supply unit M of the present embodiment, the reservoir supply section 20 is formed of the buffer tank 31 disposed in the upper portion of the stirring hopper 40 and capable of supplying the abrasive grains S toward the stirring hopper 40 when the shutter 34 disposed in the lower portion of the stirring hopper 40 is closed, and the reservoir tank 21 which is disposed in the upper portion of the buffer tank 31 to reserve the abrasive grains S from the abrasive reclaimer 10 and capable of supplying the abrasive grains S toward the buffer tank 31 when the shutter 24 disposed in the lower portion thereof is opened. The constant quantity supply unit M is operated such that one of the shutters 34 and 24 of the buffer tank 31 and the reservoir tank 21 is opened and the other is closed. In the reservoir supply section 20, when the abrasive grains S flows from the abrasive reclaimer 10, the communication state to the stirring hopper 40 is disconnected. When the abrasive grains S is supplied to the stirring hopper 40, the communication state to the abrasive reclaimer 10 is disconnected.

When the abrasive grains S is supplied to the vibration feeder 60, if the reservoir supply section 20 disconnects the communication state to the abrasive reclaimer 10, the reservoir supply section 20, the stirring hopper 40 and the vibration feeder 60 are air-tightly connected to one another, and when the cyclone 1 collects dust, the abrasive grains S is not drawn together with the dust.

Therefore, according to constant quantity supply unit M of the embodiment, the fine abrasive grains S is supplied to the vibration feeder 60 in a state where the fine abrasive grains S is circulated and used, and the abrasive grains S supplied from the reservoir supply section 20 is stirred and fractionated to prevent the flow of the abrasive grains S from being suspended. Therefore, a constant quantity of abrasive grains S can be supplied stably toward the abrasive jet nozzle 5.

The driving shaft 47 is rotated by the motor 46, and the stirring bars 50, 51 mounted to the driving shaft 47 are rotated together with the driving shaft 47, thus stirring the abrasive grains S. Therefore, the abrasive grains S sent from the buffer tank 31 and reserved in the reservoir 43 can be reliably stirred and fractionated.

Further, since the constant quantity of fractionated abrasive grains S having low fluidity with its size of several tens $\mu$m or smaller can be supplied stably, if the apparatus is utilized in a high precision micro machine device, the working precision can be enhanced, and it is possible to suppress production of the defect parts, and to enhance the yield.

Although the abrasive jet nozzle 5 is directly connected to the vibration feeder 60 to supply the abrasive grains S to the abrasive jet nozzle 5 in the constant quantity supply unit M of the embodiment, the present invention is not limited to this structure, and the vibration feeder 60 may be connected to the abrasive jet nozzle 5 through a fluidizing tank as shown in Japanese Patent publication No.2876400.

Further, the vibration feeder 60 may be provided in its upper portion with a funnel, and may supply the abrasive grains S toward the abrasive jet nozzle 5 through a helical path extending from below upward of the container as shown in Japanese Patent publication No.2876400.

The reservoir supply section is not limited to the structure including the reservoir tank and the buffer tank, and may employ any structure so long as the reservoir supply section can reserve the constant quantity of abrasive grains and can establish the air-tight state in the apparatus.

What is claimed is:

1. An constant abrasive feeder of abrasive grains comprising:
   (a) the abrasive grains blasted from an abrasive jet nozzle being recovered in a cyclone which separates said abrasive grains from the dust mixed in said abrasive grains, and said abrasive grains being supplied to be reserved in a reservoir supply section to supply a constant quantity of the reserved abrasive grains sequentially to said abrasive jet nozzle by a vibration feeder;
   (b) said reservoir supply section disconnecting a communication state to said vibration feeder at the inflow of the recovered abrasive grains, and disconnecting a communication state to said cyclone at the supply of the abrasive grains to said vibration feeder;
   (c) said vibration feeder including a feeder body and a vibrator, such that the constant quality of said abrasive grains supplied from said reservoir supply section is transferred on a feeder and supplied to said abrasive jet nozzle; and
   (d) a stirring hopper being disposed between said reservoir supply section and said vibration feeder for stirring the constant quantity of said abrasive grains sent from said reservoir supply section so as to be supplied to said vibration feeder.

2. The constant abrasive feeder of abrasive grains according to claim 1, wherein said reservoir supply section includes a reservoir tank and a buffer tank vertically aligned in a two-stage manner, and closes an opening/closing shutter disposed in said buffer tank to disconnect the communication state to said vibration feeder at the inflow of the recovered abrasive grains, and closes an opening/closing shutter disposed in said reservoir tank to disconnect the communication state to said cyclone at the supply of the abrasive grains to said vibration feeder.

3. The constant abrasive feeder of abrasive grains according to claim 1, wherein said stirring hopper comprises a hopper including a cylindrical stirring body and a reservoir portion with its shape tapered downward, a supply guide portion disposed below the hopper, and a stirring portion connected to a power source and capable of stirring said abrasive grains.

4. The constant abrasive feeder of abrasive grains according to claim 1, wherein the abrasive grains supplied from above is vibrated by the vibrator such that said vibration feeder supplies said abrasive grains to an outlet port formed in the lower portion.

* * * * *